Jan. 30, 1934.  W. S. DIEHL  1,944,878
COWLING
Filed Sept. 15, 1932   2 Sheets-Sheet 1

WALTER S. DIEHL
INVENTOR

BY Robert A. Lavender
ATTORNEY

Jan. 30, 1934.   W. S. DIEHL   1,944,878
COWLING
Filed Sept. 15, 1932   2 Sheets-Sheet 2
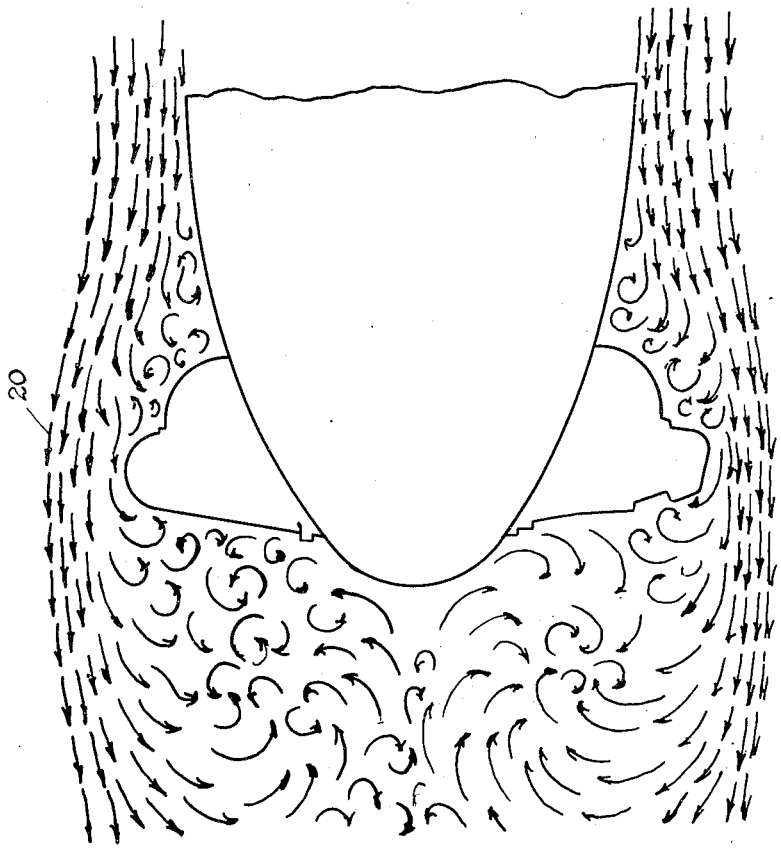
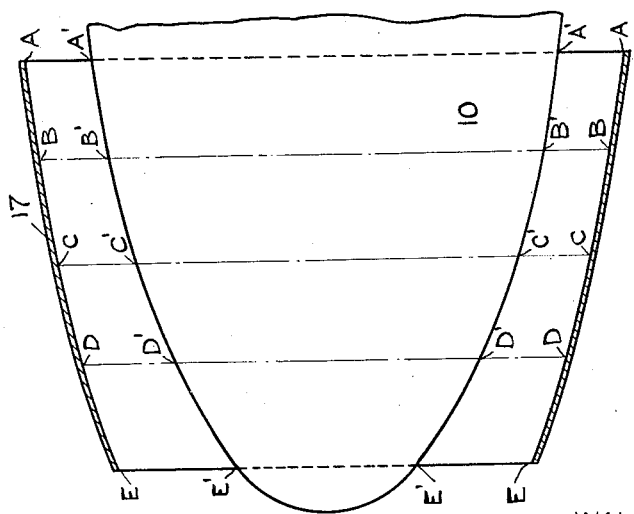
WALTER S. DIEHL
INVENTOR
BY
Robert A. Cavender
ATTORNEY Patented Jan. 30, 1934

1,944,878

UNITED STATES PATENT OFFICE 1,944,878

COWLING

Walter S. Diehl, United States Navy

Application September 15, 1932
Serial No. 633,306

3 Claims. (Cl. 244—31)

(Granted under the act of March 3, 1883, as
amended April 30, 1928; 370 O. G. 757)

My invention relates broadly to cowling, and more particularly to a ring cowl for an aircraft engine.

The use of pusher type air-cooled engines, particularly rear engines of tandem arrangements, has been very unsatisfactory owing to the difficulty of obtaining sufficient air flow to give proper cooling. The primary object of my invention, therefore, is to provide means for controlling the air flow over a pusher type engine in such a manner that any desired quantity of cooling air may be secured.

Another object of my invention is to provide a pusher type engine with a conical air-flow-control cowl for forming an annular passage to force the flow of air around and over the cylinders of the engine to cool the same.

With the above and other objects in view, the invention consists in such construction, combination and arrangement of parts as will be described more fully hereinafter.

Reference is to be had to the accompanying drawings forming a part of this specification, in which like reference characters indicate corresponding parts throughout the several views, and in which:

Fig. 2 is a detail of my improved cowling;

Fig. 3 is a rear portion of a nacelle with a pusher type engine mounted thereon illustrating the air flow.

Figure 1:
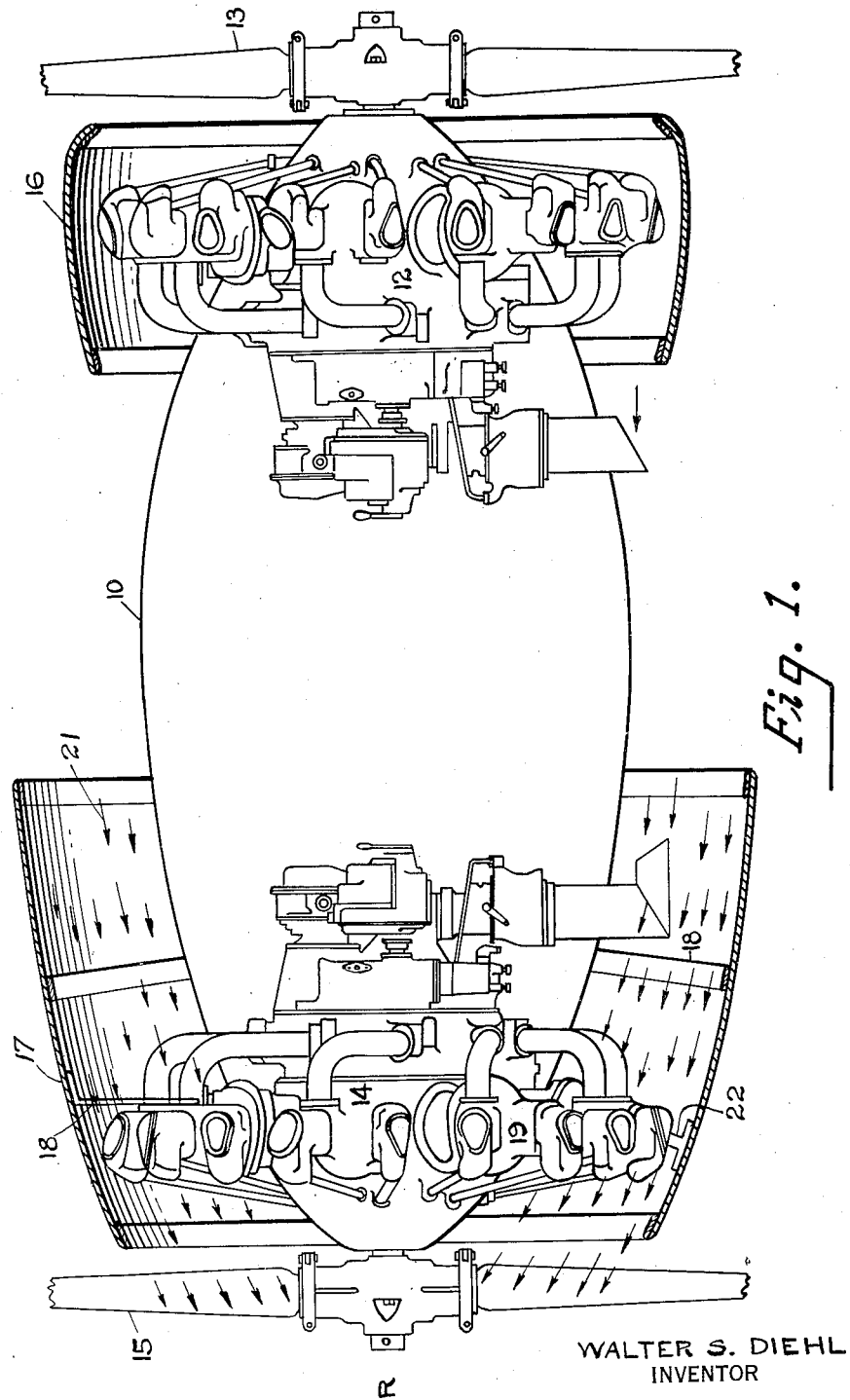
Fig. 1 is a side elevation of a nacelle having tandem engines mounted thereon and my improved cowling, shown in section, around the rear engine.

Referring more particularly to the drawings, 10 indicates an aircraft engine nacelle having a front air-cooled engine 12 for tractor propeller 13 and a rear air-cooled engine 14 for pusher propeller 15. The front engine may have cowling 16 suitably positioned around it or the same may be uncowled, since this particular part is not a direct consideration of my invention and performs no part in cooling the rear engine. For engine 14, I have provided a conoidal ring cowl 17 which encloses the engine and extends forward to a point approximately midway between the two engines, or, in general, it simply extends well forward of the rear engine to a distance in keeping with its function and operation, as will be described more fully hereinafter. The cowling 17 is suitably supported by being attached to the cylinder heads of the engine or to the nacelle by supporting struts 18.

The cowl 17 confines the air entrapped at its entrance and forces the flow of air to follow the nacelle lines and to pass over and around cylinders 19 of engine 14. In order to explain this operation, I have shown in Fig. 3 substantially the lines of air flow, as indicated by arrows 20, that occur around an uncowled pusher engine. It is noted that the cylinders are obstructions causing a slowing up of the air stream, a large part of which spills over the top of the cylinders in a highly turbulent flow, and thus only part of the air is available for cooling. The turbulent air in the rear of the engine builds up a pressure against the air flow and prevents the uniform passing of air between the cylinders. This condition, that is, the turbulent air in back of the engine building up pressure against the air flow, also exists where the rear engine is provided with a conventional type cowling such as cowling 16 placed around the forward engine. Thus with the use of any improved conoidal air-flow-control cowl, the lines of air flow are substantially as shown by arrows 21 in Fig. 1 and the air passes around and between the cylinders to cool the same. The conoidal cowl 17 forces the air to flow between the cylinders, thereby preventing the turbulent motion in the rear of the engine as shown in Fig. 3. The effectiveness of cowl 17 may be somewhat increased by various means well known, such as by the use of baffles 22 near the engine cylinders to force the air flow over the hotter parts of the cylinders.

The method of determining the form of conoidal ring 17 is shown by Fig. 2 in which the air-cooled engine cylinders have been purposely omitted for clarity. Neglecting for the time being the blocking effect of the cylinders 19, the nacelle and cowling 17 are cut by a number of vertical planes AA, BB, CC, DD, EE, etc. The air flow under consideration takes place in an annular space whose outside diameter is the diameter of the inner periphery of the ring at the given point and whose inside diameter is the nacelle diameter at the corresponding point. Referring to Fig. 2, the area of the entrance to the conoidal ring is:

$$\text{Area} = \frac{\pi}{4} [\overline{AA}^2 - \overline{A^1A^1}^2] = A_1$$

and at the section BB it is:

$$\text{Area} = \frac{\pi}{4} [\overline{BB}^2 - \overline{B^1B^1}^2] = A_2$$

and so on to the exit section EE, where:

$$\text{Area} = \frac{\pi}{4} [\overline{EE}^2 - \overline{E^1E^1}^2] = A_5$$

Now for constant velocity in an unrestricted conoidal ring, as shown, the areas should be equal, or:

$$A_1 = A_2 = A_3 = A_4 = A_5 = A_n$$

any convenient number of sections may be taken as represented by $n$. With the air-cooled engine cylinders obstructing the passage, as shown in Fig. 1, the effective area is reduced in the plane of the cylinders. This is partly compensated for by a local increase in the air velocity and partly by reduced flow through the space between the conoidal ring and the nacelle. The best proportions are influenced by many variables, but in general, a satisfactory balance of areas is obtained by reducing the entrance area so that it is about an average between the total area in the plane of the engine cylinders and the unobstructed area in the same plane.

My invention is not an anti-drag ring, but consists essentially in providing an annular passage which includes the air-cooled cylinders of a pusher type engine and which is so formed with relation to the nacelle that the cooling air is forced to flow around and over the cylinders in a manner conducive to proper cooling. Although I have shown my improved cowling placed on the rear engine of a nacelle having tandem engines, I do not desire to limit myself to a pusher type engine of tandem arrangement, but desire it to be understood that my invention can be used on all types of engines utilized in driving a pusher propeller.

It will be understood that the above description and accompanying drawings comprehend only the general and preferred embodiment of my invention, and that various changes in construction, proportion and arrangement of parts may be made within the scope of the appended claims without sacrificing any of the advantages of this invention.

The invention described herein may be manufactured and used by or for the Government of the United States of America for governmental purposes without the payment of any royalty thereon.

What I claim is:

1. In combination, an engine nacelle for an aircraft, a radial tractor engine mounted on said nacelle, a pusher propeller driven by the engine, a conoidal ring extending from the region of the engine to a point well forward of the engine and forming with said nacelle an annular air passage of substantially equal area along its length, and means for securing the ring to the nacelle and engine.

2. In combination, an engine nacelle for an aircraft, a radial air-cooled engine in the rear portion thereof, a long conoidal ring coaxially surrounding said nacelle and engine, a long constant-area annular air space formed by and between said ring and said nacelle and engine, and means for holding said ring in position.

3. In combination, an engine nacelle for an aircraft, a radial air-cooled engine secured to the rear portion of the nacelle, a conoidal ring coaxially surrounding said engine and extending around said nacelle to a point well forward of the engine, and a constant area air passage formed by and between said ring and said nacelle and engine, the annular area of said passage being measured from the inner periphery of the ring at a given point to the outer circumference of the nacelle at a corresponding point, and means securing said ring to the engine and the nacelle so as to form the passage of equal area throughout its entire length.

WALTER S. DIEHL.